Patented Sept. 3, 1940

2,213,460

UNITED STATES PATENT OFFICE 2,213,460

CHROMABLE DYESTUFFS OF THE TRIARYLMETHANE SERIES

Wilhelm Eckert and Karl Schilling, Frankfort-on-the-Main-Hoechst, Germany, assignors to General Aniline & Film Corporation, a corporation of Delaware No Drawing. Application March 1, 1939, Serial No. 259,286. In Germany February 26, 1936

4 Claims. (Cl. 260—336)

The present invention relates to chromable dyestuffs of the triarylmethane series.

This application is a continuation-in-part to our application Serial No. 127,312, now issued as U. S. Patent 2,153,059 dated April 4, 1939.

We have found that very clear dyestuffs of the triarylmethane series capable of being chromed are obtainable by condensing one molecular proportion of the anhydride of 5-hydroxybenzene-1.2.4-tricarboxylic acid or of 3-hydroxybenzene-1.2.4-tricarboxylic acid (5- or 3-hydroxytrimellitic acid) or the equivalent amount of the free acid with 2 molecular proportions of an N-substituted m-amino-phenol, the condensation being suitably carried out so that the hydroxy-trimellitic anhydride concerned is used in excess. The same or similar dyestuffs are obtainable by condensing 1 molecular proportion of an N-substituted m-aminophenol or a molecular proportion of resorcylic acid with the substituted benzoyl-benzoic acid which is obtainable by condensation of one molecular proportion of hydroxy-trimellitic acid with only one molecular proportion of the N-substituted m-aminophenol and is probably formed as intermediate product in the condensation referred to in the preceding sentence. When an N-substituted m-aminophenol is used, the formation of the dyestuff probably occurs, for instance, as follows:

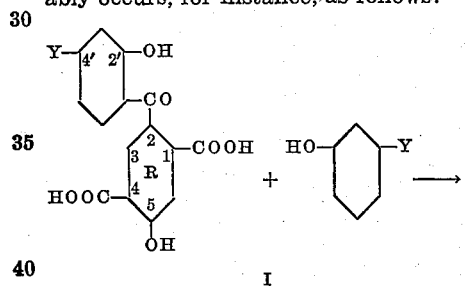

I

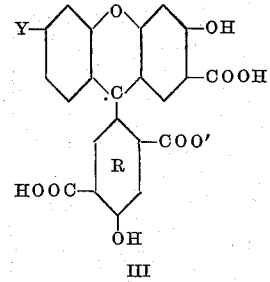

II wherein Y represents a substituted amino group.

The dyestuffs obtainable according to the process of the present invention are new. For instance, there are obtained dyestuffs which probably correspond with the general formulae:

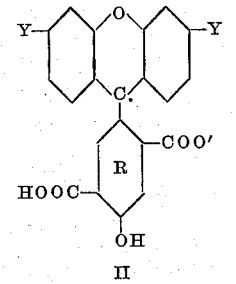

II and

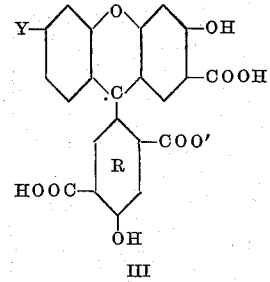

III wherein Y represents a substituted amino-group.

The same dyestuffs may also be characterized by a quinoid constitution as follows:

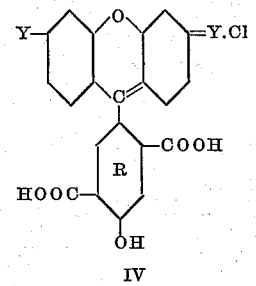

IV and

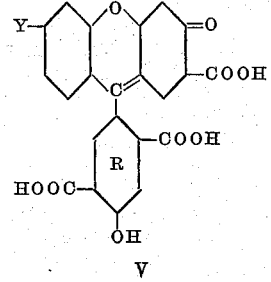

V respectively, wherein Y represents a substituted amino-group.

It is not known with certainty whether the hydroxyl and carboxyl groups, standing in ortho positions to each other in the nuclei R of the formulae I to V, occupy the positions indicated in these formulae. The hydroxytrimellitic acid may react in another manner than supposed with the N-substituted m-aminophenol and there may be formed isomeric compounds of the general constitutions:

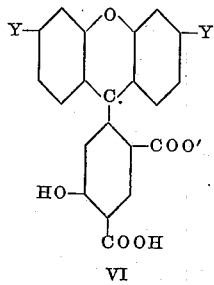

VI and

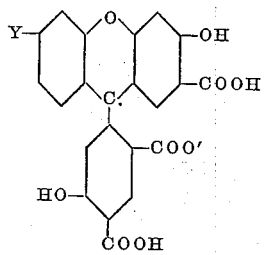

VII wherein Y represents a substituted amino-group, or the corresponding quinoide constitutions.

The dyestuffs dye, for instance, animal fibers very clear red shades; by after-chroming the fastness properties of the dyeings towards, for instance, water, washing, perspiration, sea water, fulling, carbonizing and light, are essentially enhanced. The dyestuffs may also be after-chromed in substance.

The following examples serve to illustrate the invention, but they are not intended to limit it thereto; the parts are by weight:

*Example 1.*—100 parts of 5-hydroxy-trimellitic anhydride and 75 parts the sodium salt of meta-diethylamino - phenol - omega.omega'-disulfonic acid (or the equivalent amount of the free disulfonic acid) are melted together at 200° C. to 210° C. for 2 to 3 hours.

The pulverized melt is stirred into 500 parts of water and the whole is allowed to stand at about 10° C. for a long time (about 12 hours). Hereby the dyestuff dissolves, whereas a great part of the hydroxy-trimellitic acid used in excess precipitates in the form of crystals. The whole is filtered with suction and the red filtrate is stirred with 20 parts of calcuim hydroxide in order to eliminate entirely hydroxytrimellitic acid which still remains in solution.

The hydroxytrimellitic acid forms an insoluble calcium salt and goes into the precipitate which is removed by filtering with suction. The filtrate thus purified is rendered feebly acid to Congo paper by means of sulfuric acid, concentrated to about 100 parts by volume, filtered from the separated calcium sulfate and equal volume of saturated sodium chloride solution is added, while hot. On cooling, the dyestuff precipitates in the form of large flakes and may easily be filtered with suction. The dyestuff having the following constitution:

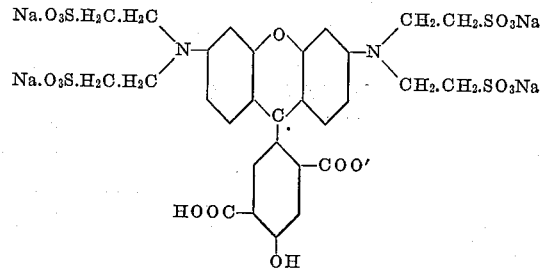

dyes wool from an acid bath clear bluish-red tints which, on after-chroming, become still more bluish and are essentially enhanced in their fastness properties; the dyestuffs may be used with a good success in printing with chromium on cotton and may be transformed according to known methods in substance into the corresponding chromium compounds.

*Example 2.*—140 parts of the sodium salt of 3-(ethyl-sulfo-ethyl-amino)-4-methyl-phenol of the formula:

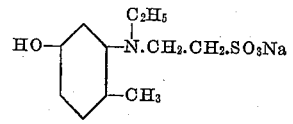

and 210 parts of 5-hydroxy-trimellitic anhydride are melted together at 200° C. to 210° C. for 2 hours. The pulverized melt is stirred into 1000 parts of water and 200 parts of calcium hydroxide are added thereto. After stirring for half-an-hour, the precipitate is filtered with suction and washed with warm water. The filtrate is rendered feebly acid to Congo paper by means of sulfuric acid, concentrated to about 100 parts by volume and filtered from the separated calcium sulfate and to the filtrate is added twice its volume of saturated sodium chloride solution. On cooling, the dyestuff precipitates in the form of red flakes which can easily be filtered with suction. The dyestuff corresponds to the formula:

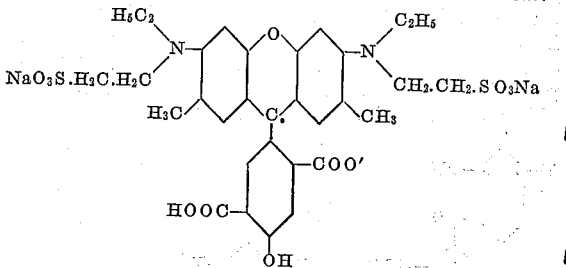

It dyes wool from an acid bath clear red shades which, on after-chroming, become a little more bluish and show very good properties of fastness.

*Example 3.*—150 parts of (4'-diethylamino-2'-hydroxy)-1-benzoyl-hydroxy-carboxy-2-benzoic acid (obtainable by melting in the course of several hours at 120° C. meta diethylamino phenol with 5-hydroxy-trimellitic anhydride) and which corresponds to the formula

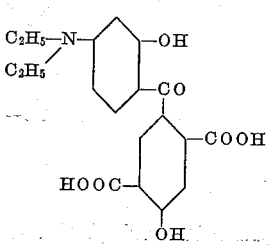

are triturated with 250 parts of the sodium salt of diethylamino-meta-phenol-omega.omega'-disulfonic acid and the whole is stirred into 2500 parts of concentrated sulfuric acid. The whole is heated to 90° C. to 100° C., while stirring, until the formation of the dyestuff is at an end. The dyestuff is precipitated by pouring the solution on ice, separated by filtering with suction of the separated dyestuff, dissolving the dyestuff in as small a quantity of hot water as possible and salting out by means of sodium chloride. The dyestuff which dyes wool from an acid bath very clear red shades has the following constitution:

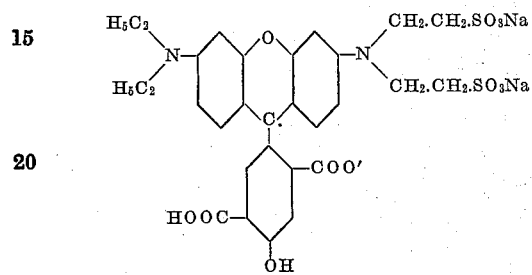

By after-chroming the properties of fastness are essentially enhanced. The dyestuffs may be used with a good success in printing with chromium on cotton and may be transformed according to known methods in substance into the corresponding chromium-compounds.

*Example 4.*—65 parts of 5-hydroxytrimellitic anhydride are heated at 180° C. to 190° C. together with 32 parts of the sodium salt of meta-methyl-ethylamino-phenol-omega-sulfonic acid for 4 hours. The pulverized melt is treated with 200 parts of alcohol for a short time in the warm in order to eliminate the hydroxytrimellitic acid in excess and after cooling, the undissolved matter is filtered with suction. The solid residue is dissolved in about 100 parts of water, the solution is filtered and the dyestuff is salted out by means of sodium chloride. The red dyestuff possesses the following constitution:

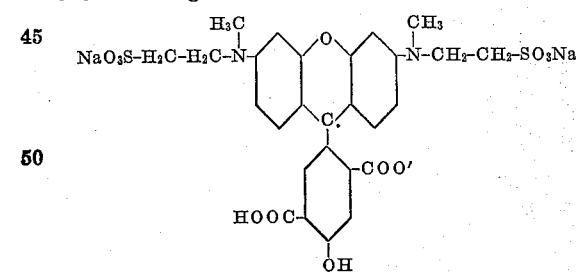

and dyes wool from an acid bath very clear bluish red tints which, on after-chroming, are enhanced in their properties of fastness. The dyestuffs may be used with a good success in printing with chromium on cotton and may be transformed according to known methods in substance into the corresponding chromium compounds.

*Example 5.*—54 parts of sodium ethyl-omega-sulfoethyl-amino-meta-phenol of the formula

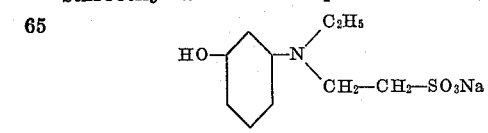

are stirred into 82 parts of molten 5-hydroxytrimellitic anhydride. The temperature of the melt is elevated, while stirring, to 220° C. After about 1 hour the melt solidifies, after further heating for 2 to 3 hours the reaction is terminated. After cooling, the melt is finely triturated and stirred for several hours at ordinary temperature together with 200 parts of alcohol. The hydroxytrimellitic anhydride used in excess thereby dissolves, whereas the dyestuff remains.

It is filtered with suction, washed with a small quantity of alcohol and dried. The dyestuff is a red powder which dissolves readily in water and dyes the animal fiber from an acid bath bright bluish-red tints, which on after-chroming have very good fastness properties. The dyestuff may also be used for chrome printing on cotton and artificial silk. Its constitution is represented by the following isomeric formulae:

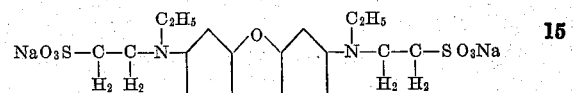

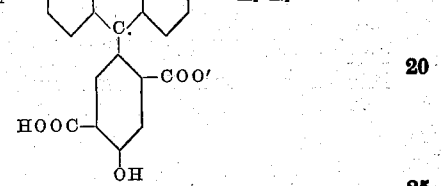

or

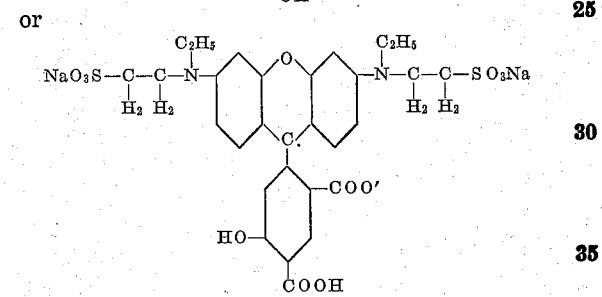

The same dyestuff may advantageously also be prepared by starting from the free 5-hydroxytrimellitic acid whereby a small excess of the acid over the theoretical amount suffices. 29.6 parts sodium ethyl-omega-sulfoethylamino-meta-phenol of 92 per cent strength, and 12.4 parts of 5-hydroxy-trimellitic acid are heated for 6 hours at 180° C., while stirring, together with 30 parts of an addition compound prepared from 1 mol of pyridine hydrochloride and 1 mol of zinc chloride. After cooling the melt is finely triturated and is further worked up as described in the foregoing paragraph.

We claim:
1. The compounds of the formula:

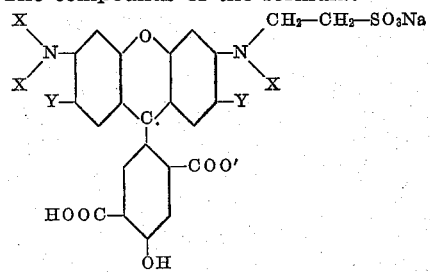

wherein the X's stand for radicals of the group consisting of methyl, ethyl and —CH$_2$—CH$_2$—SO$_3$Na, and the Y's stand for a member of the group consisting of hydrogen and methyl, being dyestuffs which dye wool from an acid bath clear vivid tints, the fastness properties of the dyeings, particularly the fastness to washing and fulling, being essentially enhanced by after-chroming, and which may be used with a good success in printing with chromium on cotton and may be transformed according to known methods in substance into the corresponding chromium compounds.

2. The compound of the formula:

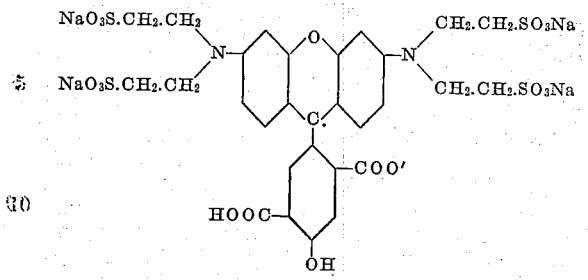

being a dyestuff which dyes wool from an acid bath clear bluish-red tints which on after-chroming become still more bluish and are essentially enhanced in their fastness properties, which dyestuff may be used with a good success in printing with chromium on cotton and may be transformed according to known methods in substance into the corresponding chromium-compounds.

3. The compound of the formula

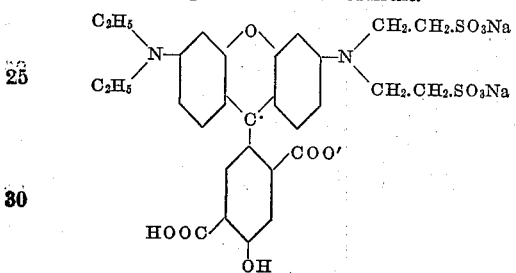

being a dyestuff which dyes wool from an acid bath very clear red shades and may be used with a good success in printing with chromium on cotton and may be transformed according to known methods in substance into the corresponding chromium compounds.

4. The compound of the formula

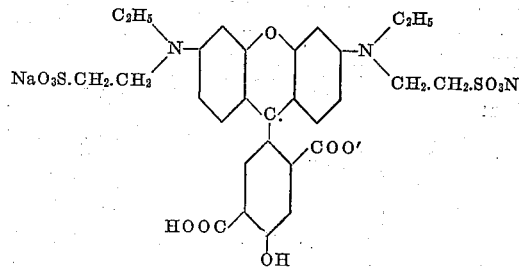

being a dyestuff which dyes animal fibers from an acid bath very clear bluish-red tints which on after-chroming are enhanced in their properties, which dyestuff may be used with a good success in printing with chromium on cotton and may be transformed according to known methods in substance into the corresponding chromium compounds.

WILHELM ECKERT.
KARL SCHILLING.